US006702221B2

(12) United States Patent
Haber et al.

(10) Patent No.: US 6,702,221 B2
(45) Date of Patent: Mar. 9, 2004

(54) MAGNETORHEOLOGICAL FLUID ACTIVELY CONTROLLED BOBBIN TENSIONING APPARATUS

(75) Inventors: David S. Haber, Gardena, CA (US); Emil M. Shtarkman, Marina Del Rey, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 10/143,474

(22) Filed: May 7, 2002

(65) Prior Publication Data

US 2003/0209626 A1 Nov. 13, 2003

(51) Int. Cl.[7] .............. B65H 23/06; F16F 9/53
(52) U.S. Cl. ............... 242/421.4; 188/267.2; 242/155 M
(58) Field of Search .......... 242/421.4, 420.5, 242/156.2, 155 M, 147 M; 192/21.5, 21.6; 188/267, 267.1, 267.2

(56) References Cited

U.S. PATENT DOCUMENTS

| | | | | |
|---|---|---|---|---|
| 4,516,739 A | * | 5/1985 | Wyatt | 242/155 M |
| 4,844,371 A | * | 7/1989 | Tahara | 242/421.1 |
| 4,869,476 A | | 9/1989 | Shtarkman | |
| 4,896,752 A | | 1/1990 | Shtarkman | |
| 4,942,947 A | | 7/1990 | Shtarkman | |
| 4,946,115 A | * | 8/1990 | Muller | 242/289 |
| 4,992,190 A | | 2/1991 | Shtarkman | |
| 5,167,850 A | | 12/1992 | Shtarkman | |
| 5,176,368 A | | 1/1993 | Shtarkman | |
| 5,257,681 A | | 11/1993 | Shtarkman et al. | |
| 5,354,488 A | | 10/1994 | Shtarkman et al. | |
| 5,367,459 A | | 11/1994 | Shtarkman et al. | |
| 5,517,096 A | | 5/1996 | Shtarkman et al. | |
| 5,524,834 A | * | 6/1996 | Bogucki-Land | 242/421.8 |
| 5,598,908 A | * | 2/1997 | York et al. | 192/21.5 |
| 5,816,372 A | * | 10/1998 | Carlson et al. | 188/267.2 |
| 5,896,965 A | * | 4/1999 | Gopalswamy et al. | 192/21.5 |
| 5,921,357 A | | 7/1999 | Starkovich et al. | |
| 6,186,290 B1 | * | 2/2001 | Carlson | 188/164 |
| 6,338,447 B1 | * | 1/2002 | Stanier et al. | 242/155 M |
| 2002/0162713 A1 | * | 11/2002 | Lisenker et al. | 188/267.2 |
| 2002/0171067 A1 | * | 11/2002 | Jolly et al. | 252/570 |

FOREIGN PATENT DOCUMENTS

JP  5-253618  * 10/1993 .............. 242/421.4

* cited by examiner

*Primary Examiner*—Kathy Matecki
*Assistant Examiner*—Evan Langdon
(74) *Attorney, Agent, or Firm*—Harness, Dickey & Pierce, P.L.C.

(57) ABSTRACT

A method and apparatus for controlling the tension in a bobbin assembly having a supply bobbin with yarn thereon. As the yarn is fed to a drive bobbin, a magnetic field is variably applied to magnetorheological fluid to apply resistance to the supply bobbin as it rotates thereby controlling the tension on the yarn.

17 Claims, 5 Drawing Sheets

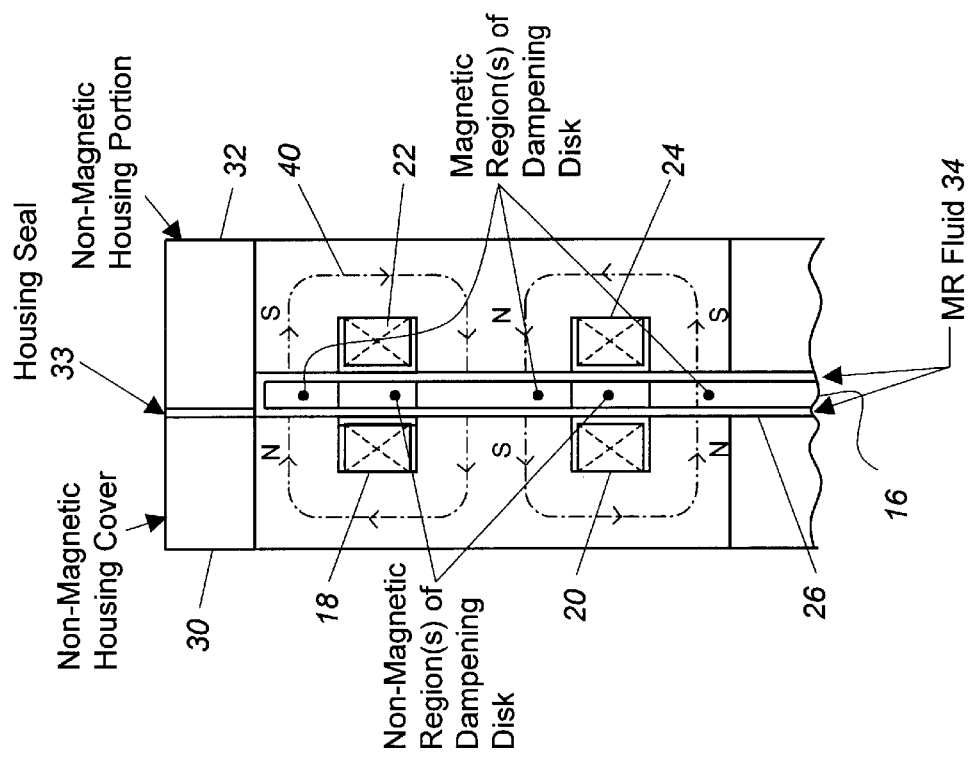
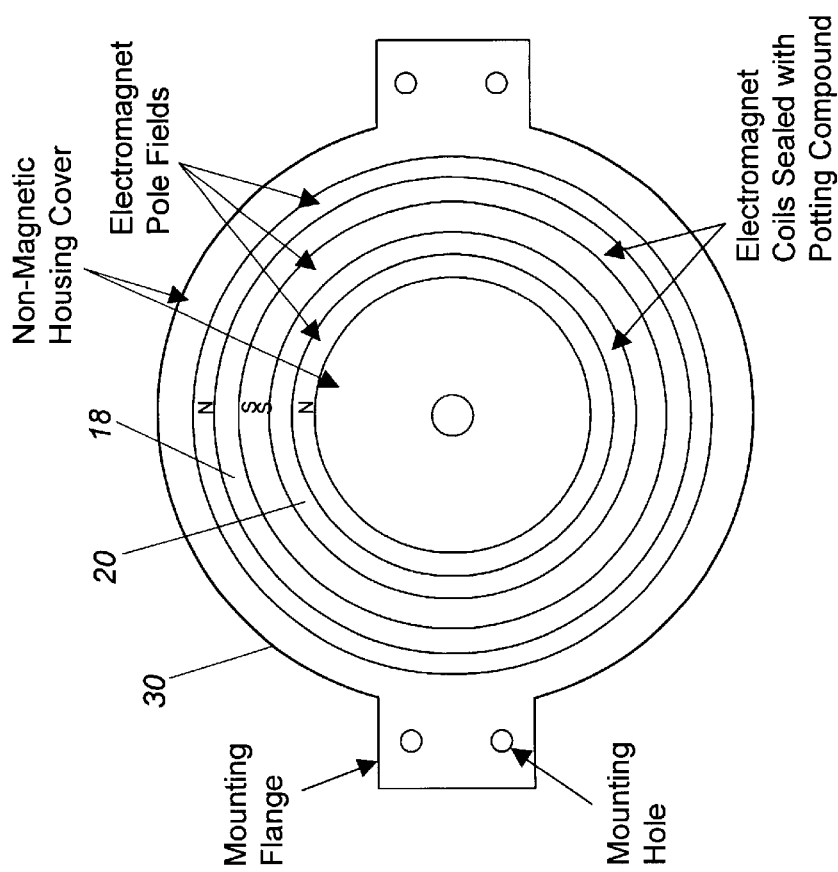
(Detail B-B)
FIG. 4
(Section A-A)
FIG. 3

(Section D-D)

(Section C-C)

MAGNETORHEOLOGICAL FLUID ACTIVELY CONTROLLED BOBBIN TENSIONING APPARATUS

TECHNICAL FIELD

The present invention relates generally to a tensioning system for controlling tension in a bobbin assembly and, more particularly, to the use of a magnetic responsive fluid to adjust the amount of tension associated with the bobbin.

BACKGROUND OF THE INVENTION

A tensioning system in which a bobbin is used to receive or deliver yarn should allow the bobbin to "take up" or "let out" yarn in a manner in which yarn tension is controlled. The bobbin usually supports yarn on a shaft that rotates to receive or deliver the yarn. During the rotation of the bobbin, variability in tension load or in the moment of inertia associated with the bobbin and yarn may develop and create undesired conditions of yarn movement. Control of yarn tension mitigates variable conditions and eliminates the need to form design margins for material variations that occur because of uncontrolled changes in the tension load and moment of inertia.

Systems and methods to control yarn tension traditionally utilize a weight that is attached to the yarn material or a friction clutch through which the yarn passes. However, the weight causes abrasions and does not adjust for irregular bobbin tension. Other systems and methods to adjust yarn tension use a friction clutch through which the yarn passes, but which may damage the yarn. Yet other systems and methods to change yarn tension use an electromagnetic tensioning device designed for yarn that is wrapped around a bell housing and provides a drag on the yarn. As a result, slippage and a loss of tension are possible. A system and method is therefore desired which will control yarn tension and overcome the problems of yarn overloading due to variability in the bobbin and yarn system load and variable moment of inertia.

SUMMARY OF THE INVENTION

The present invention provides an apparatus for controlling the tension in a bobbin assembly having a supply bobbin with yarn wrapped thereon. The yarn is fed to a drive bobbin. A device is coupled to the supply bobbin and rotates as the yarn is fed to the drive bobbin. Magnetorheological fluid is in fluid contact with at least a part of the device. A variable magnetic field generator supplies a magnetic field to the magnetorheological fluid. Thus, resistance is applied to the device as it rotates with the supply bobbin. As a result, tension on the yarn is controlled.

BRIEF DESCRIPTION OF THE DRAWINGS

The various advantages of the present invention will become apparent to one skilled in the art by reading the following specification and subjoined claims and by referencing the drawings in which:

FIG. 3 is a cross-sectional view of FIG. 1 taken along line A—A illustrating a housing of the bobbin tensioning apparatus;

FIG. 4 is a detail view of FIG. 1 taken along line B—B illustrating the magnetic flux path of the dual bilateral electromagnetic coil arrangement;

DETAILED DESCRIPTION OF THE PREFERRED EMBODIMENTS

Figure 1:
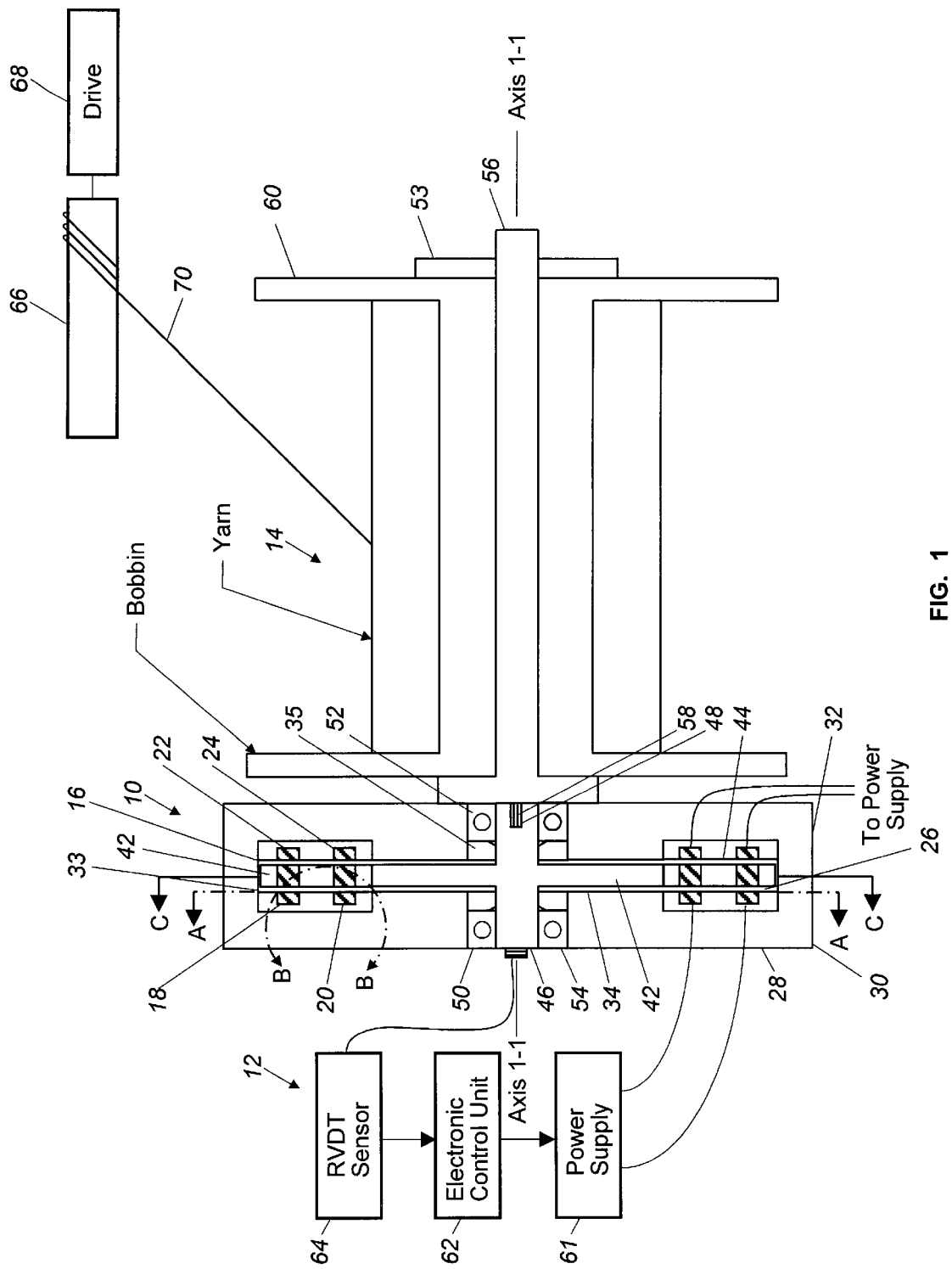
FIG. 1 is a cross-sectional view of a first embodiment of a bobbin tensioning apparatus made in accordance with the present invention, illustrating a dual bilateral coil arrangement.

Referring to FIG. 1, magnetorheological fluid actively controlled bobbin tensioning apparatus 10 is shown with electric control system 12 and bobbin assembly 14. Rotational tensioning apparatus 10 includes damper disk 16, electromagnetic coils 18, 20, 22 and 24, magnetorheological (MR) fluid chamber 26 and housing 28. Housing 28 includes first cover 30 and second cover 32 for supporting damper disk 16. First cover 30 and second cover 32 are sealed together via housing seal 33 and bearing seals 35. MR fluid chamber 26 contains the magnetorheological fluid which surrounds damper disk 16. As is known is the art, magnetorheological fluid is a magnetic responsive fluid 34 having a variable shear strength as a function of an applied magnetic field. First cover 30 and second cover 32 are preferably made of a non-metallic material.

Figure 2:
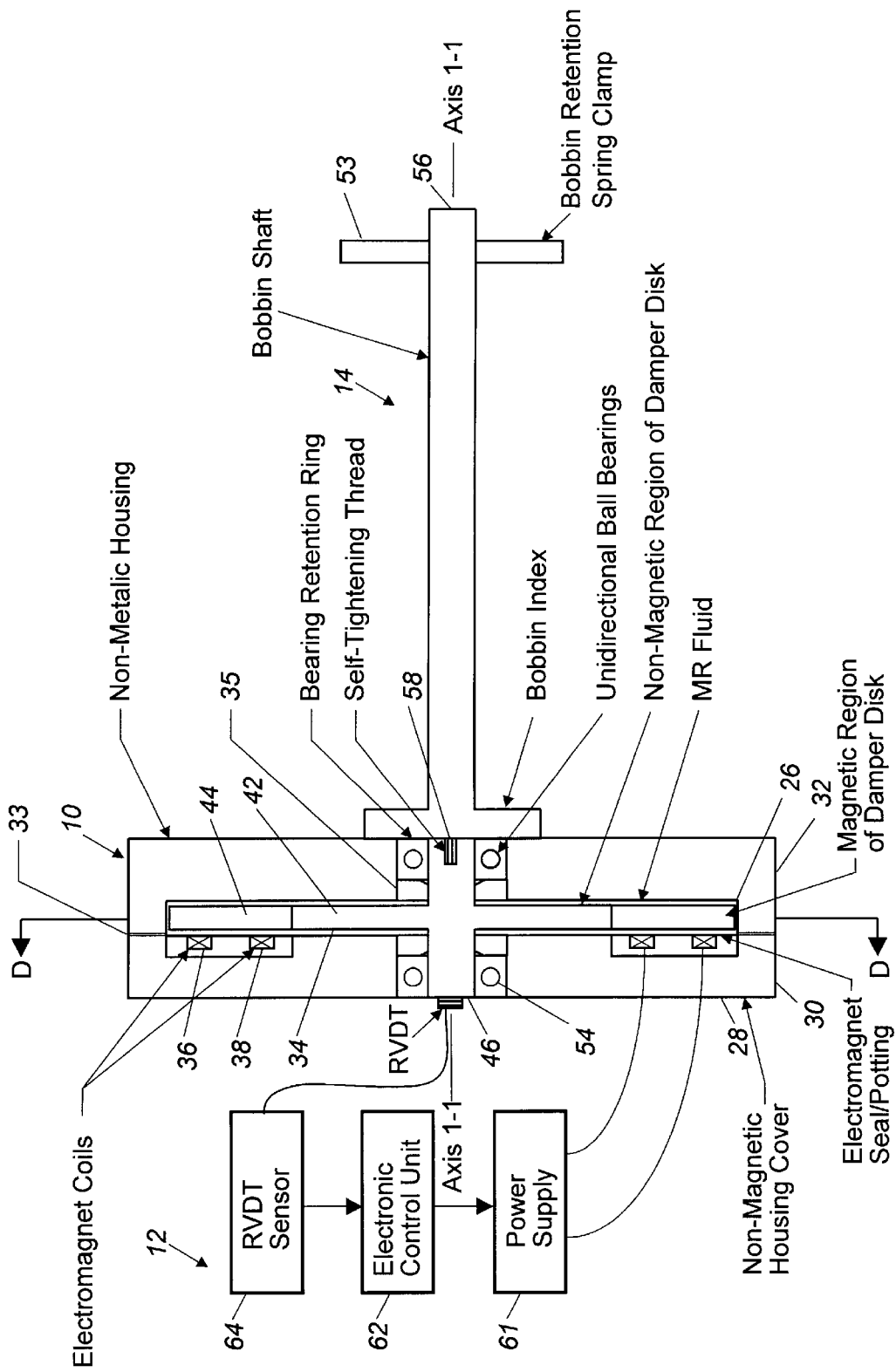
FIG. 2 is a cross-sectional view of an alternate embodiment of a bobbin tensioning apparatus in accordance with the present invention illustrating a dual electromagnetic coil arrangement.
Figure 5B:
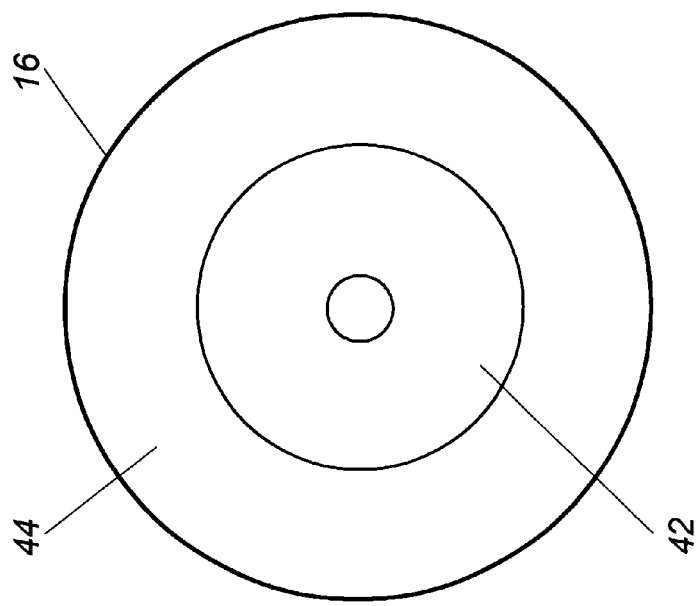
FIG. 5B is a cross-sectional view taken along the lines D—D of FIGS. 2 and 6 illustrating the preferred damping disk used in these alternative embodiments.
Figure 5A:
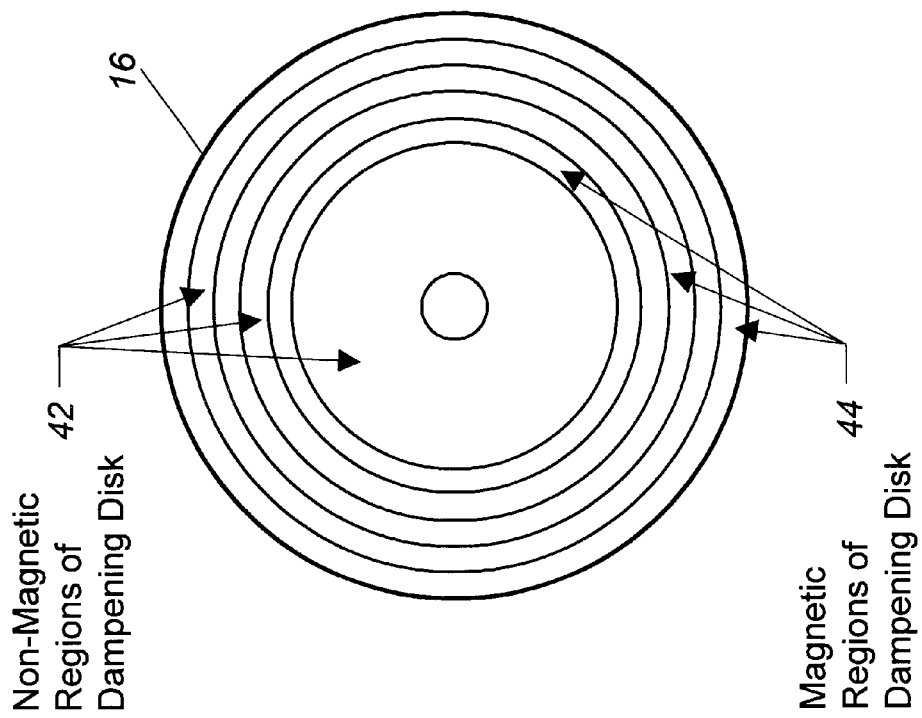
FIG. 5A is a cross-sectional view of FIG. 1 taken along line C—C illustrating the damping disk of the bobbin tensioning apparatus.
Figure 6:
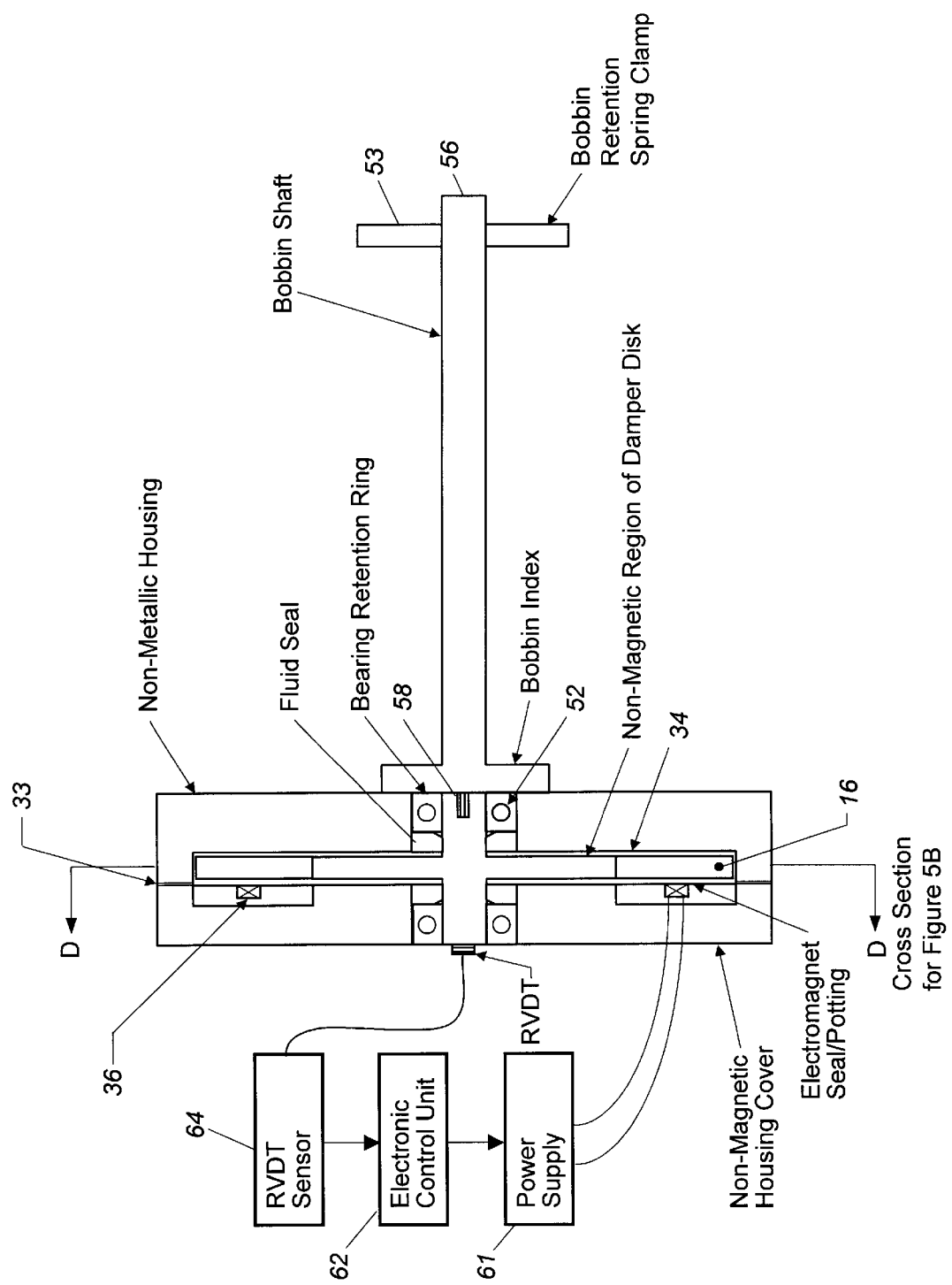
FIG. 6 is a cross-sectional view of a third embodiment of a bobbin tensioning apparatus showing a single electromagnetic coil arrangement.

In the first embodiment shown in FIG. 1, first cover 30 and second cover 32 of housing each have sealed dual bilateral electromagnetic coils 18, 20, 22 and 24, thereby forming opposite double electromagnetic coil pairs. For example, electromagnetic coil 18 and electromagnetic coil 22, and electromagnetic coil 20 and electromagnetic coil 24 are pairs, respectively. The electromagnetic coils produce magnetic flux that passes through the fluid 34. A double coil arrangement is illustrated in FIG. 2 and a single coil arrangement is shown in FIG. 6. Two electromagnetic coils 36 and 38 are disposed on one side of the fluid chamber 26 in FIG. 2 whereas only one coil 36 is employed in the FIG. 6 embodiment. However, the arrangement of the electromagnetic coils into pairs in which opposite poles are facing each other (FIG. 1) minimize the cancellation of the magnetic flux and allows more efficient use of the energy which acts on the fluid 34 within the fluid chamber 26.

Referring to FIGS. 1 and 4, electromagnetic coils oppositely positioned on either side of the damper disk 16 allow proportional change in the torque with respect to the power input. Additionally, the use of oppositely positioned coils allows for a decrease in the size of the coils required to produce a desired magnetic flux, and thus the housing may be reduced in width and/or diameter. The smaller size housing is beneficial in manufacturing processes where a limited amount of space is available and where the bobbin assemblies must be placed in close proximity.

FIG. 4 best illustrates the positions of electromagnetic coils 18, 22 and 20, 24 in opposite pair arrangements, respectively. The opposite pairs of electromagnetic coils 18, 22 and 20, 24 are separated by the damper disk 16 and the fluid chamber 26. The electromagnetic coils 18, 22 and 20, 24 are energized and produce magnetic fields that interact with each other. The magnetic fields interact with each other to produce the magnetic flux 40 between the coil pairs and through the outer annular segment of the damper disk 16 and the fluid 34. As a result, the magnetic flux acts on the fluid 34 to adjust its resistance applied to the disk segment that rotates with the supply bobbin.

Referring to FIGS. 1, 2, 5A, 5B and 6 damper disk 16 is circular shaped. However, it should be appreciated that the damper disk may be of any appropriate shape. The damper disk includes a non-magnetic segment 42 and magnetic segments 44 that are selected to minimize magnetic leakage and any interactive cancellation of magnetic flux produced by the electromagnetic coils. Non-magnetic segments 42 include pin 46. Pin 46 is rotatably supported within channels 50 and 52 in each of first cover 30 and second cover 32 and by bearings 54. In the exemplary embodiment, bearings 54 are supported within first cover 30 and second cover 32, however it should be appreciated that any appropriate type of friction reduction mechanism may be used to facilitate the desired rotation of the damper disk 16. For example, the bearings may be unidirectional ball bearings and allow rotation in one direction, thereby minimizing any backlash or back rotation that may occur if rotation of the bobbin abruptly stops and residual tension is present in the yarn.

Damper disk 16 rotates relative to housing 28 along an axis of rotation 1-1. Damper disk 16 is also coupled to bobbin shaft 56 of the bobbin assembly 14 so that the disk 16 and supply bobbin rotate together. In the exemplary embodiment, self-tightening thread 58 maintains a unitary connection between damper disk 16 and bobbin shaft 56, however it should be appreciated that any appropriate connection may be used. Bobbin shaft 56 terminates at an end opposite self-tightening thread 48 with a bobbin retention spring clamp 53 that maintains bobbin 60 on bobbin shaft 56. In the exemplary embodiment bobbin assembly 14 is coupled to the rotational tensioning device 10; however it should be appreciated that any mechanism that requires a controlled rotational displacement and/or tension may be coupled to and controlled by the rotational tensioning device 10.

Electronic control system 12 supplies a varying DC current to energize the coils that, in turn, generate magnetic flux as a function of the level of applied current. Control system includes a power supply 61, electronic control unit 62, and rotational variable displacement transducer (RVDT) sensor 64 that senses the rotational speed of the supply bobbin. Power supply 61 provides current flow to the electromagnetic coils. The electronic control unit 62 is suitably programmed to provide the desired current that creates desired back tension or drag on the yarn based on the manufacturing or process requirements. The electronic control unit 62 uses the displacement output signals generated from RVDT sensor 64 to determine needed tension adjustments.

Electromagnetic coils 18, 22 and 20, 24 each generate a magnetic field that interact and produce a magnetic flux as best illustrated in FIG. 4. The magnetic flux passes through the MR fluid in the fluid chamber 26. As a result, the MR fluid responds to the magnetic flux such that the shear resistance of the fluid changes. Therefore, by varying the current applied to the electromagnetic coils the shear resistance of the MR fluid 34 on the damper disk 16 within the MR fluid chamber 26 varies, and consequently the back tension of the bobbin assembly 14 may be adjusted.

Operation of the bobbin tensioning apparatus 10 occurs when bobbin shaft 56 is rotating. Damper disk 16 rotates about axis 1-1 relative to the housing 28 through the fluid 34. During rotation of bobbin shaft 56, current flow is supplied to the electromagnetic coils 18, 20, 22 and 24. A magnetic flux is produced across the MR fluid 34 within the chamber 26 and varies according to the current flow. Accordingly, the shear properties of the fluid change and the drag on rotation of the damper disk 16 (and, therefore, on supply bobbin 60) changes based on the variation of the shear strength of the fluid.

During normal operation, yarn 70 is fed from supply bobbin 60 to a drive bobbin 66 which is rotated by a suitable drive mechanism 68. It is important, in many instances, to make sure that the yarn is properly wound about the drive bobbin 66. However, yarn overloading is possible due to dynamic conditions, such as variable inertia or changes in the tension load of the bobbin assembly. The adjustment of the resistance applied by the MR fluid to the damper disk 16 during rotation, however, provides back tension or drag on the yarn and controls yarn tension. Thus, yarn overloading is minimized.

In the exemplary embodiment, RVDT sensor 64 is coupled to the damping disk 16 and measures rotational displacement of damping disk 16 and bobbin shaft 56. The RVDT sensor 64 is coupled to an electronic control unit 62 that compares the measured rotational displacement to a desired rotational displacement. The electronic control unit 62 provides a signal that is indicative of the amount of power or current which the power supply 61 provides to the electromagnetic coils 18, 20, 22 and 24.

If the measured rotational displacement is different than the desired rotational displacement, tension is adjusted to compensate for variations in the drawing mechanism's performance. The back tension or drag is adjusted to compensate the rotation of the bobbin assembly so that the desired rotational displacement is achieved, and, accordingly, yarn is delivered at a desired consistent and controlled tension. As a result, manufacturing processes that need consistent yarn tension will be able to produce a more uniform quality yarn, more certain material properties of the yarn, and greater cost effectiveness by utilizing the teachings of this invention.

The description of the invention is merely exemplary in nature, and thus variations that do not depart from the gist of the invention are intended to be within the scope of the invention. Such variations are not to be regarded as a departure from the spirit and scope of the invention. For example, for purposes of this invention the term "yarn" should be construed in its broadest sense to include flexible elongated members, strands, fibers, filaments, cords, lines, and the like; and, more particularly, graphite fibers, wires, GorTex™ and similar materials for making such products as GFRP tapes and fabrics, antenna mesh and appendages.

What is claimed is:

1. An apparatus for controlling tension in yarn, the apparatus comprising:
    a housing having a sealed fluid chamber;
    a supply bobbin having the yarn wrapped thereon, the supply bobbin extending from the housing along a first longitudinal axis;
    a device coupled to the supply bobbin for rotation therewith, the device including a first surface formed generally perpendicular to the first longitudinal axis;
    magnetorheological fluid disposed within the fluid chamber of the housing and adjacent at least a part of the device; and
    a first pair of electromagnetic coils disposed adjacent the first surface of the device for supplying a magnetic field to the magnetorheological fluid to apply resistance to the device as it rotates with the supply bobbin to thereby control the tension on the yarn.

2. The apparatus of claim 1 which further comprises:

a sensor for sensing the rotation of the supply bobbin, said sensor being coupled to the first pair of electromagnetic coils to control a flux of the magnetic field as a function of the rotation of the supply bobbin.

3. The apparatus of claim 1 wherein the device comprises a disk coupled to a shaft which rotates with the supply bobbin.

4. The apparatus of claim 1 further comprising a second pair of electromagnetic coils.

5. The apparatus of claim 4 wherein the first pair of electromagnetic coils are formed on an opposite side of the device from the second pair of electromagnetic coils.

6. The apparatus of claim 3 wherein the shaft is supported by unidirectional bearings.

7. The apparatus of claim 3 wherein at least a portion of the shaft passes through the housing, with the disk being coupled to the shaft portion within the housing or rotation therewith.

8. The apparatus of claim 7 wherein the chamber and disk segment are annular.

9. The apparatus of claim 8 wherein the housing is made of non-metallic material.

10. The apparatus of claim 6 wherein the housing comprises a first cover and a second cover, the first and second covers matingly joined to form the fluid chamber therebetween.

11. The apparatus of claim 1 wherein the magnetorheological fluid completely fills the fluid chamber of the housing.

12. The apparatus of claim 10 wherein a gasket is disposed between the first and second covers, the gasket operable to seal the fluid chamber.

13. The apparatus of claim 1 wherein the device comprises a magnetic portion and a non-magnetic portion, the magnetic and non-magnetic portions operable to minimize leakage and cancellation of magnetic flux produced by the electromagnetic coils.

14. A method for controlling the tension of yarn, the method comprising:

providing a supply bobbin with yarn wrapped on an exterior surface thereof;

rotating the supply bobbin;

generating a velocity signal indicative of the speed of rotation of the supply bobbin;

sending the velocity signal to an electronic control unit, the control unit operable to compare the velocity signal to a predetermined velocity and generate an output signal indicative thereof; and energizing a first pair of electromagnetic coils in response to the output signal to thereby apply a magnetic flux through a magnetorheological fluid disposed proximate the supply bobbin, the maqnetorheological fluid operable to apply resistance to the supply bobbin to control rotation of the supply bobbin and adjust the tension on the yarn.

15. The method of claim 10 which further comprises:

positioning a second pair of electromagnetic coils proximate said magnetorheological fluid, the first and second pairs of electromagnetic coils operable to receive power from the power source to generate a magnetic flux through the magnetorheological fluid.

16. The method of claim 14 wherein the supply bobbin rotates on a shaft carrying a disk, with the magnetorheological fluid applying resistance to the disk.

17. The method of claim 16 further comprising the step of immersing the disk in a bath of the magnetorheological fluid, the magnetorheological fluid operable to selectively restrict rotation of the disk.

\* \* \* \* \*